United States Patent
Brandenburger et al.

(10) Patent No.: US 8,057,864 B2
(45) Date of Patent: Nov. 15, 2011

(54) METHOD FOR COATING A CEMENT FIBERBOARD ARTICLE

(75) Inventors: Larry B. Brandenburger, Circle Pines, MN (US); Daniel W. DeChaine, Anoka, MN (US); T. Howard Killilea, North Oaks, MN (US); Andrew Ubel, Saint Paul, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 12 days.

(21) Appl. No.: 12/183,975

(22) Filed: Jul. 31, 2008

(65) Prior Publication Data

US 2010/0040797 A1    Feb. 18, 2010

Related U.S. Application Data

(63) Continuation of application No. PCT/US2007/061327, filed on Jan. 30, 2007.

(60) Provisional application No. 60/764,131, filed on Jan. 31, 2006.

(51) Int. Cl.
*C08F 2/48* (2006.01)
*C08F 2/46* (2006.01)
*C08F 2/54* (2006.01)

(52) U.S. Cl. .............. 427/496; 427/421.1; 427/508; 427/517

(58) Field of Classification Search .......... 427/508, 427/517, 421.1, 496
See application file for complete search history.

(56) References Cited

U.S. PATENT DOCUMENTS

| | | | |
|---|---|---|---|
| 2,128,961 A | 9/1938 | Patterson |
| 2,356,542 A | 8/1944 | Sloan |
| 2,633,458 A | 3/1953 | Shokal |
| 2,674,775 A | 4/1954 | Willson |
| 2,727,012 A | 12/1955 | Treat et al. |
| 2,730,517 A | 1/1956 | Vogel et al. |
| 3,010,919 A | 11/1961 | MacKinney et al. |
| 3,049,458 A | 8/1962 | Willard |
| 3,091,551 A | 5/1963 | Robertson |
| 3,219,467 A | 11/1965 | Redican et al. |
| 3,380,831 A | 4/1968 | Cohen et al. |
| 3,449,161 A | 6/1969 | Hindersinn et al. |
| 3,655,423 A | 4/1972 | Lin et al. |
| 3,781,396 A | 12/1973 | Okuda et al. |
| 3,935,173 A | 1/1976 | Ogasawara et al. |

(Continued)

FOREIGN PATENT DOCUMENTS

AU    198060655 A1    3/1981

(Continued)

OTHER PUBLICATIONS

ISR and Written Opinion for PCTUS/2007/061327 dated May 15, 2007.

(Continued)

*Primary Examiner* — Elena T Lightfoot
(74) *Attorney, Agent, or Firm* — IPLM Group, P.A.

(57) ABSTRACT

The bottom of a cement fiberboard article is coated by conveying the article across a gap between a first conveyor and second conveyer and applying a liquid radiation-curable coating system to at least the bottom surface of the article while the article passes over the gap. The coating system is radiation-cured to at least a reduced tack state before the coated surface contacts the second conveyor.

30 Claims, 1 Drawing Sheet

U.S. PATENT DOCUMENTS

| | | |
|---|---|---|
| 3,935,364 A | 1/1976 | Proksch et al. |
| 4,015,040 A | 3/1977 | Hoshida et al. |
| 4,113,893 A | 9/1978 | Hahn |
| 4,132,526 A | 1/1979 | Schwarz et al. |
| 4,197,389 A | 4/1980 | Becker et al. |
| 4,228,761 A | 10/1980 | Glover et al. |
| 4,333,867 A | 6/1982 | Sauntson |
| 4,385,152 A | 5/1983 | Boyack et al. |
| 4,390,688 A | 6/1983 | Walz et al. |
| 4,408,018 A | 10/1983 | Bartman et al. |
| 4,486,553 A | 12/1984 | Wesch |
| 4,536,534 A | 8/1985 | Singer et al. |
| 4,582,755 A | 4/1986 | Dietrich |
| 4,598,108 A | 7/1986 | Hoefs |
| 4,719,149 A | 1/1988 | Aasen et al. |
| 4,742,121 A | 5/1988 | Toman |
| 4,852,316 A | 8/1989 | Webb |
| 4,880,660 A | 11/1989 | Aasen et al. |
| 4,886,852 A | 12/1989 | Numa |
| 4,908,229 A | 3/1990 | Kissel |
| 4,916,004 A | 4/1990 | Ensminger et al. |
| 5,073,578 A | 12/1991 | Boodaghains et al. |
| 5,100,948 A | 3/1992 | Aydin et al. |
| 5,296,530 A | 3/1994 | Bors et al. |
| 5,407,783 A | 4/1995 | Caruso |
| 5,418,264 A | 5/1995 | Obloh et al. |
| 5,426,142 A | 6/1995 | Rosano et al. |
| 5,461,125 A | 10/1995 | Lu et al. |
| 5,484,849 A | 1/1996 | Bors et al. |
| 5,500,457 A | 3/1996 | Sarkar et al. |
| 5,534,310 A | 7/1996 | Rokowski et al. |
| 5,559,192 A | 9/1996 | Bors et al. |
| 5,562,953 A | 10/1996 | Bors et al. |
| 5,567,767 A | 10/1996 | Smeal et al. |
| 5,571,863 A | 11/1996 | Smeal et al. |
| 5,672,379 A | 9/1997 | Schall et al. |
| 5,681,385 A | 10/1997 | Beckenhauer |
| 5,688,867 A | 11/1997 | Scheibelhoffer et al. |
| 5,708,077 A | 1/1998 | Nölken et al. |
| 5,708,093 A | 1/1998 | Bastelberger et al. |
| 5,718,943 A | 2/1998 | Hsu et al. |
| 5,766,768 A | 6/1998 | Cummings et al. |
| 5,777,053 A | 7/1998 | McBain et al. |
| 5,798,426 A | 8/1998 | Anton et al. |
| 5,814,397 A * | 9/1998 | Cagliostro et al. ............ 428/216 |
| 5,874,503 A | 2/1999 | Scheibelhoffer et al. |
| 5,928,778 A | 7/1999 | Takahashi et al. |
| 5,945,044 A | 8/1999 | Kawai et al. |
| 5,962,571 A | 10/1999 | Overbeck et al. |
| 5,973,068 A | 10/1999 | Yamaya et al. |
| 5,994,428 A | 11/1999 | Lutz et al. |
| 6,030,447 A | 2/2000 | Naji et al. |
| 6,045,871 A | 4/2000 | Matt et al. |
| 6,048,471 A | 4/2000 | Henry |
| 6,063,864 A | 5/2000 | Mathur et al. |
| 6,103,352 A | 8/2000 | Takahashi |
| 6,114,440 A | 9/2000 | Yamaya et al. |
| 6,136,383 A | 10/2000 | Schwartz et al. |
| 6,146,710 A | 11/2000 | Symons |
| 6,162,511 A | 12/2000 | Garnett et al. |
| 6,235,228 B1 | 5/2001 | Nicholl et al. |
| 6,297,320 B1 | 10/2001 | Tang et al. |
| 6,346,146 B1 | 2/2002 | Duselis et al. |
| 6,458,250 B1 | 10/2002 | Holliday et al. |
| 6,475,556 B1 | 11/2002 | Sobczak et al. |
| 6,485,601 B1 | 11/2002 | Egan et al. |
| 6,485,793 B1 | 11/2002 | Ott et al. |
| 6,492,450 B1 | 12/2002 | Hsu |
| 6,506,248 B1 | 1/2003 | Duselis et al. |
| 6,534,176 B2 | 3/2003 | Terase et al. |
| 6,555,625 B1 | 4/2003 | Overbeek et al. |
| 6,590,025 B1 | 7/2003 | Carlson et al. |
| 6,635,735 B1 | 10/2003 | Zhang et al. |
| 6,638,567 B1 | 10/2003 | Beisele |
| 6,641,629 B2 | 11/2003 | Safta et al. |
| 6,649,679 B1 | 11/2003 | Stockl et al. |
| 6,660,386 B2 | 12/2003 | Haque |
| 6,696,518 B1 | 2/2004 | Dersch et al. |
| 6,740,423 B2 | 5/2004 | Murase |
| 6,753,394 B2 | 6/2004 | Weikard et al. |
| 6,762,230 B2 | 7/2004 | Brandenburger et al. |
| 6,818,697 B2 | 11/2004 | Zhang et al. |
| 6,849,338 B2 | 2/2005 | Clemens et al. |
| 6,893,751 B2 | 5/2005 | Naji et al. |
| 6,941,720 B2 | 9/2005 | DeFord et al. |
| 6,998,012 B2 | 2/2006 | Koelliker et al. |
| 7,049,352 B2 | 5/2006 | Gould et al. |
| 7,105,593 B2 | 9/2006 | Solomon et al. |
| 7,148,270 B2 | 12/2006 | Bowe |
| 7,235,595 B2 | 6/2007 | Hermes et al. |
| 7,235,603 B2 | 6/2007 | Madle et al. |
| 7,238,391 B2 | 7/2007 | Dargontina et al. |
| 7,265,166 B2 | 9/2007 | Gebhard et al. |
| 7,338,989 B2 | 3/2008 | Gross et al. |
| 7,381,785 B2 | 6/2008 | Detrembleur et al. |
| 7,449,516 B2 | 11/2008 | Bayer et al. |
| 2002/0179240 A1 | 12/2002 | Clemens et al. |
| 2002/0195191 A1 | 12/2002 | Weiss et al. |
| 2003/0055171 A1 | 3/2003 | Overbeek et al. |
| 2003/0073778 A1 | 4/2003 | Zhang et al. |
| 2003/0150359 A1 | 8/2003 | Lassmann |
| 2003/0153673 A1 | 8/2003 | Schwalm et al. |
| 2003/0203991 A1 | 10/2003 | Schottman et al. |
| 2003/0207121 A1 | 11/2003 | McGee |
| 2003/0224184 A1 | 12/2003 | Hermes et al. |
| 2004/0044094 A1 | 3/2004 | Garnett |
| 2004/0082715 A1 | 4/2004 | Bayer et al. |
| 2004/0176502 A1 | 9/2004 | Raymond et al. |
| 2004/0198903 A1 | 10/2004 | Madle et al. |
| 2004/0229978 A1 | 11/2004 | Bowe |
| 2005/0027079 A1 | 2/2005 | Palmer Lauer et al. |
| 2005/0053797 A1 * | 3/2005 | Rumph et al. ................ 428/541 |
| 2005/0203211 A1 | 9/2005 | Gebhard |
| 2005/0208285 A1 | 9/2005 | Lyons et al. |
| 2006/0013950 A1 | 1/2006 | Porter et al. |
| 2006/0024480 A1 | 2/2006 | Lyons et al. |
| 2006/0048708 A1 * | 3/2006 | Hartig ........................... 118/715 |
| 2006/0135684 A1 | 6/2006 | Killilea |
| 2006/0135686 A1 | 6/2006 | Killilea et al. |
| 2006/0182946 A1 * | 8/2006 | Zarb et al. .................. 428/312.4 |
| 2006/0288909 A1 | 12/2006 | Naji et al. |
| 2007/0042192 A1 | 2/2007 | Nguyen et al. |
| 2007/0110981 A1 | 5/2007 | Killilea et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0282046 A1 | 12/2007 | Killilea et al. |
| 2008/0008895 A1 | 1/2008 | Garner et al. |

FOREIGN PATENT DOCUMENTS

| | | |
|---|---|---|
| AU | 2005100347 B4 | 5/2005 |
| DE | 33 02 767 A1 | 8/1984 |
| EP | 0 060 505 A1 | 9/1982 |
| EP | 486 278 A1 | 5/1992 |
| EP | 0 623 659 A2 | 11/1994 |
| EP | 0 697 417 A1 | 2/1996 |
| EP | 0705 855 A2 | 4/1996 |
| EP | 0 728 779 B2 | 8/1996 |
| EP | 0 894 780 A1 | 2/1999 |
| EP | 1 454 935 A1 | 9/2004 |
| EP | 1 473 331 A1 | 11/2004 |
| EP | 1 589 083 A2 | 10/2005 |
| EP | 1 650 045 A2 | 4/2006 |
| GB | 1 407 827 | 9/1975 |
| JP | 54 038323 | 3/1979 |
| JP | 01-229242 | 9/1989 |
| JP | 02 308887 | 12/1990 |
| JP | 08-059939 | 3/1996 |
| JP | 11 236281 | 8/1999 |
| JP | 03-44986 A | 12/2000 |
| JP | 2003251269 | 9/2003 |
| JP | 2005307161 A | 11/2005 |
| JP | 2006 117812 | 5/2006 |
| SU | 833892 | 5/1981 |
| WO | WO 94/07674 A1 | 4/1994 |
| WO | WO 98/45222 | 10/1998 |
| WO | WO 99/67312 | 12/1999 |

| WO | WO 00/23495 A1 | 4/2000 |
| --- | --- | --- |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO 2007/089807 A2 | 8/2007 |
| WO | WO 2007/089913 A1 | 8/2007 |
| WO | WO 2007/090132 A1 | 8/2007 |

OTHER PUBLICATIONS

Koleske et al., *Two Thousand Three Additives Guide*, Paint and Coatings Industry, Apr. 2003, pp. 1-76.

Witzeman, J. S. et al., *Comparison of Methods for the Preparation of Acetoacetylated Coating Resins*, Coatings Technology; vol. 62, No. 789, Oct. 1990, pp. 101-112 (and references contained therein).

Clemens R. J. et al., *A Comparison of Catalysts for Crosslinking Acetoacetylated Resins via the Michael Reaction*, Journal of Coatings Technology, Mar. 1989, vol. 61, No. 770, pp. 83-91.

Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.

Tennebroek et al., *New Polymer Synthesis for (self) Crosslinkable Urethanes and Urethane Acrylics*, 4$^{th}$ Nürnberg Congress; International Centre for Coatings Technology, Paper 17, 2000, 19 pages.

Guerts, J.M. et al., *Self-crosslinkable Urethanes and Urethane/Acrylics*, Verfkroniek Nummer, Jan. 1999.

Geon® Lo-Sope Dispersion Resin, Geon® 171 Vinyl Chloride Homopolymer Technical Data Sheet, PolyOne Corporation, May 2003, 2 pages.

Geon Copolymer Dispersion Resin Geon® 137 Vinyl Chloride Copolymer Technical Data Sheet, PolyOne Corporation, Apr. 1997, 2 pages.

Industrial Research Services, *Test Report No. 54703-1 for Epirez Safe Step 100*, CSIRO, Manuf. & Infrastr. Technology, Australia, May 2004, pp. 1-6.

DSM NeoResins, Technical Data Sheet, DSM NeoResins Inc., Bulletin XK-90, Jan. 2006, 6 pages.

Tex•Cote® Stretch Product Information, Textured Coatings of America, Inc., Panama City, Florida, Nov. 2003, 3 pages.

UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/ http://www.dow.com/ucarlatex/app/arch/ex_fiber.htm.

Rector, F.D. et al., *Applications for the Acetoacetyl Chemistry in Thermoset Coatings*, Journal of Coatings Technology, vol. 61, No. 771, Apr. 1989.

Dow® Z-6018 Intermediate Product Information, "Silicone Intermediates", 3 pgs., (Aug. 28, 2006).

ASTM D6944-03, Test Method A (2003).

Witzeman, J. S. et al., *Comparison of Methods for the Preparation of Acetoacetylated Coating Resins*, Coatings Technology; vol. 62, No. 789, pp. 101-112 (Oct. 1990).

Wicks, Z.W. et al., *Epoxy and Phenolic Resins*, Organic Coatings Science and Technology, vol. 1, Chapter XI, pp. 162-187 (1992).

American Society of Testing Materials, ASTM Designation: D523-89 (Reapproved 1999), "Standard Test Method for Specular Gloss;" 5 pages.

American Society of Testing Materials, ASTM Designation: D5402-93 (Reapproved 1999), "Standard Practice for Assessing the Solvent Resistance of Organic Coatings Using Solvent Rubs;" 3 pages.

Eastman Chemical Company, Publications N-319C, Kingport, TN., Dec. 1999, Title Page, Table of Contents, "Acetoacetoxyethyl Methacrylate (AAEM) Acetoacetyl Chemistry," pp. 1-11.

Lewis et al., "Luminescence", Hawley's Condensed Chemical Dictionary, 14$^{th}$ Ed., John Wiley and Sons, Inc., retrieved from Knovel® online; 1 page (2002).

"Photoinitiators for UV Curing," "Darocur 1173", p. 2; Ciba Specialty Chemicals; 8 pages (2003).

U.S. Federal Register, vol. 60, No. 116, pp. 31633-31637, Jun. 16, 1995.

Wicks, Zeno W. Jr., et al., "Latexes", Organic Coatings, Science and Technology, Second Edition, (Wiley-Interscience, New York, 1999), Title Page, Copyright Page, Chapter 8, p. 143.

"Ancarez AR550 Waterborne Epoxy Resin Technical Bulletin", Air Products and Chemicals, Inc., High Performance Coatings Resins, Pub. No. 125-9914, 13 pages, (Mar. 2006).

"Anquamine 401 Curing Agent Technical Bulletin", Air Products and Chemicals, Inc., Epoxy Curing Agents and Modifiers, Publication No. 125-9744,1 page, (May 2004).

"Polycat 41 Catalyst", Product Information Sheet, Air Products and Chemicals, Inc., 2 pages, (2003).

* cited by examiner

Fig. 1

METHOD FOR COATING A CEMENT FIBERBOARD ARTICLE

CROSS-REFERENCE TO RELATED APPLICATION

This application is a continuation is a National Stage filing of International Application No. PCT/US2007/061327, filed on Jan. 30, 2007, which claims priority under 35 U.S.C. 119 (e) to U.S. Provisional Patent Application Ser. No. 60/764, 131, filed Jan. 31, 2006, the disclosures of which are incorporated herein by reference in their entirety.

BACKGROUND OF THE INVENTION

Cement composite articles are becoming more and more common for use in building materials. Many of these articles are prepared from inexpensive materials, such as cement, wood (cellulose) fibers, natural (glass) fibers and polymers. These articles usually are prepared in the form of cement fiberboard substrates such as siding panels and boards. The substrate or articles can be made using methods such as extrusion or using a Hatschek machine.

In northern climates, damage from repeated freezing and thawing of water absorbed into the cement fiberboard substrate represents a significant problem. Continued exposure to moisture, freeze-thaw cycles, UV exposure and atmospheric carbon dioxide can cause physical and chemical changes in articles made from cement fiberboard compositions over time. Coating systems or coating compositions can prevent exposure to the elements such as UV light, carbon dioxide and water, or can help reduce the damage that can occur due to exposure to these elements. Several such systems are available for protecting cement fiberboard articles. However, there is a need for coating systems and coating compositions that provide a superior seal, have the ability to cure rapidly or can provide improved results when an article coated with the composition is submitted to wet adhesion testing and multiple freeze-thaw cycles.

SUMMARY

The present invention provides a method for coating a cement fiberboard article. The method includes the steps of: (i) providing a conveying system having a first conveyor, a second conveyer and a gap between them; (ii) conveying a cement fiberboard article across the gap; (iii) applying a liquid radiation-curable coating system to at least the bottom surface of the article while the article passes over the gap; and (iv) at least partially curing the coating system to a reduced tack state with radiation before the coated surface contacts the second conveyor. The coating system may be applied in one or more layers.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawing and the description below. Other features, objects, and advantages of the invention will be apparent from the description and drawings, and from the claims.

BRIEF DESCRIPTION OF THE DRAWING

Like reference symbols in the various figures of the drawing indicate like elements. The elements in the drawing are not to scale.

DETAILED DESCRIPTION

The terms "a," "an," "the," "at least one," and "one or more" are used interchangeably.

The recitation of numerical ranges by endpoints includes all numbers subsumed within that range (e.g., 1 to 5 includes 1, 1.5, 2, 2.75, 3, 3.80, 4, 5, etc.).

The term "comprises" and variations thereof does not have a limiting meaning where such term appears in the description or claims. Thus, for example, a composition comprising a wax compound means that the composition includes one or more wax compounds.

The terms "acrylate esters" and "methacrylate esters" refer to esters of acrylic acid and esters of methacrylic acid, respectively. They may be referred to as (meth)acrylates or (meth)acrylate esters.

The term "olefinic compound" refers to any monomer, oligomer or polymer containing reactive ethylenic unsaturation, such as vinyls, (meth)acrylates, vinyl ethers, allyl ethers, vinyl esters, unsaturated oils (including mono, di and triglycerides), unsaturated fatty acids, and the like. The term "olefinic group" refers to the reactive ethylenic unsaturated functional group in an olefinic compound.

The term "reactive sites" or "reactive groups" refers to a group that can react to form a covalent bond linking or otherwise chemically joining two or more molecules.

The term "cured to a reduced tack state" means that the coating system has been cured to a state such that it will remain on the article and not be likely to adhere to the components, e.g., rollers, etc., of the second conveyor.

The present invention provides a method for coating an article such as a cement fiberboard siding product or other cement composite article with a radiation curable coating system. The method includes the steps of: (i) providing a conveying system having a first conveyor, a second conveyer and a gap between them, (ii) conveying a cement fiberboard article across the gap; (iii) applying a liquid radiation-curable coating system to at least the bottom surface of the article while the article passes over the gap; and (iv) at least partially curing the coating system to a reduced tack state with radiation before the coated surface contacts the second conveyor (viz., before the coated surface contacts a downstream portion of the conveying system). The disclosed coating systems can be "cured to a reduced tack state" before the coated article contacts the second conveyor. The disclosed articles may be coated on one or more surfaces with the disclosed radiation-curable coating system. A coating system suitable for practicing the invention preferably includes one or more olefinic compounds, and optionally includes one or more polyvinyl chloride (PVC) dispersion resins. In another embodiment, the coating system is substantially free of volatile solvents or carriers.

Cement fiberboard articles are large, heavy and during manufacture are usually transported on a conveying system, e.g., belts, rollers, air tables and the like. The bottom (back) of the article is a major surface which typically stays in contact with the conveying system. The disclosed method allows the bottom surface of a cement fiberboard article to be coated during transport, e.g., at the site where the cement fiberboard article is made.

Figure 1:
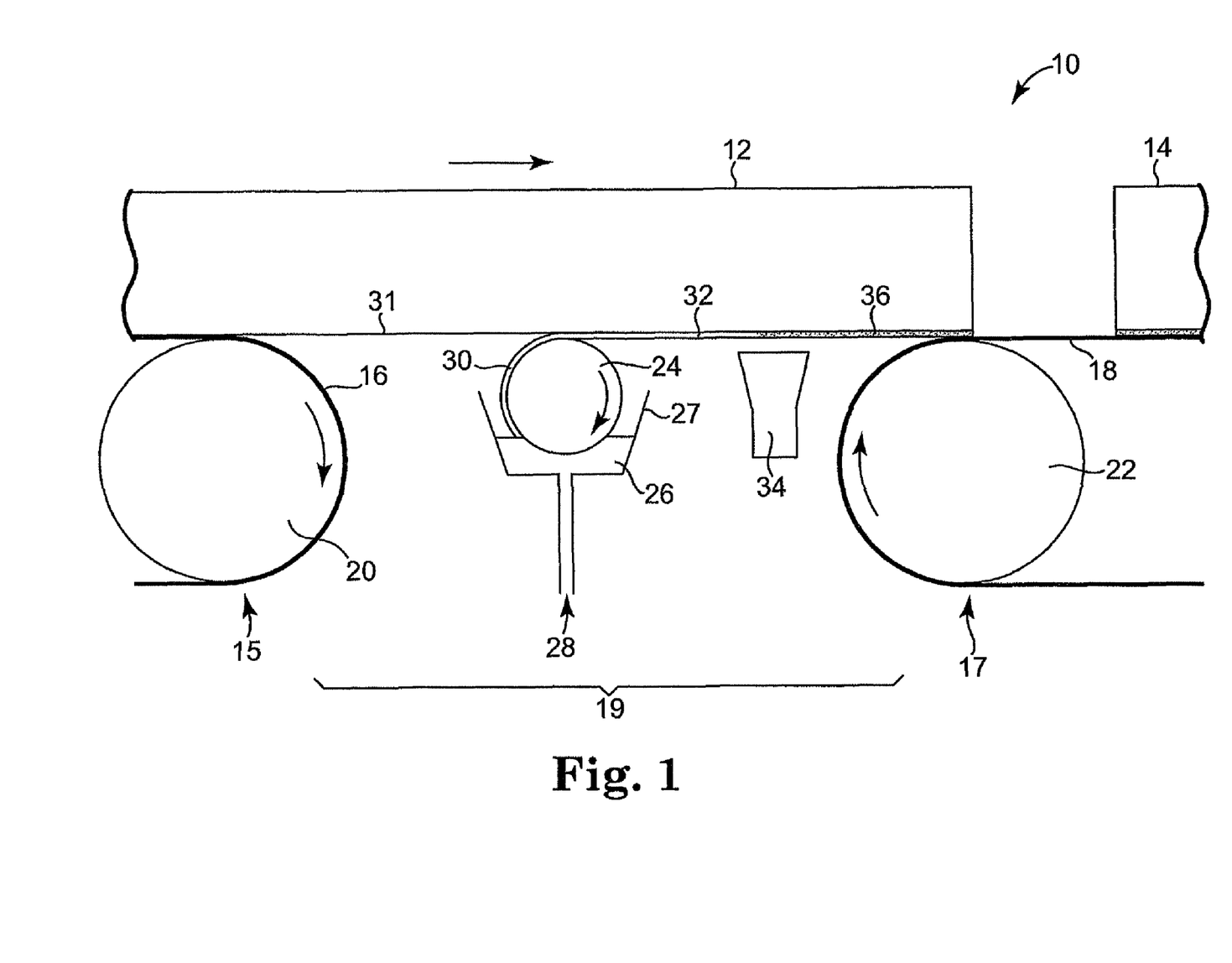
FIG. 1 is a schematic view of the disclosed process.

Referring to FIG. 1, an apparatus 10 for coating the bottom of cement fiberboard articles is shown in schematic side view. Cement fiberboard articles such as siding boards 12 and 14 are conveyed into apparatus 10 on first conveyor 15, which in the embodiment shown in FIG. 1 includes a belt 16 and drive wheels such as drive wheel 20. Boards 12 and 14 are conveyed out of apparatus 10 on second conveyor 17, which in the embodiment shown in FIG. 1 includes a belt 18 and drive wheels such as drive wheel 22. If desired, other types of conveyors which will be familiar to those skilled in the art may be employed, including roller conveyors having no belts and air beds. While passing through apparatus 10, boards 12 and 14 are conveyed across a gap 19 between first conveyor 15 and second conveyor 17. Roll coater 24 located between first conveyor 15 and second conveyor 17 is supplied with a liquid radiation-curable coating system 26 contained in reservoir 27. The supply of coating system 26 in reservoir 27 may be replenished through supply line 28. Roll coater 24 applies a thin film 30 of coating system 26 to the bottom surface 31 of board 12 while board 12 passes over gap 19, forming an uncured thin film 32 on surface 31 downstream from roll coater 24. Roll coater 24 also helps support board 12 while it passes over gap 19. Radiation curing unit 34 converts film 32 to an at least partially cured coating 34 before the coated surface of board 12 contacts belt 18 on second conveyor cures 17. Coating 34 lies adjacent to and partially penetrates surface 31, and desirably is applied to board 12 at the location where board 12 is manufactured. Coating 34 may help to protect board 12 against one or more of exposure to moisture, freeze-thaw cycles or atmospheric carbon dioxide. Coating 34 also may provide a firmly-adhered base layer upon which one or more firmly-adhered layers of a topcoat (not shown in FIG. 1) may be formed.

The disclosed cement fiberboard articles can be coated on one or more surfaces with the disclosed radiation-curable coating systems and coating compositions. The coating system can be applied as one or more layers. Suitable coating systems comprise one or more olefinic compounds, e.g., monomers, oligomers, or polymers, and optionally one or more PVC dispersion resins. In one exemplary embodiment the coating system includes at least one olefinic compound, and may be applied to the substrate and cured using radiation. In another exemplary embodiment, the coating system includes a first coating composition that includes at least one olefinic compound, and a second coating composition that includes at least one PVC dispersion resin. The two coating compositions may be applied to the substrate sequentially or concurrently and sequentially or simultaneously cured using radiation. In another exemplary embodiment the coating system includes at least one olefinic compound and at least one PVC dispersion resin, and may be applied to the substrate and cured using radiation. Further details regarding the latter two embodiments are contained in applicants' copending PCT Application Serial No. (PCT/US2007/002587) filed Jan. 30, 2007 and entitled COATING COMPOSITION FOR CEMENT COMPOSITE ARTICLES.

Curing preferably is initiated essentially immediately after application of the composition(s) to the article. Curing is carried sufficiently to convert the coating to at least a reduced tack state (and desirably to a more completely cured state, e.g., an essentially fully cured state) before the coated surface of the article contacts the second conveyor. Rapid curing may be facilitated by using a coating system containing little or no volatile solvents, e.g., a 100% solids composition.

The olefinic compound in the disclosed coating systems appears to function as a reactive penetrant. This may be better appreciated by observing the coating system after it is applied to the substrate but before radiation curing is performed. The olefinic compound appears to improve wetting or penetration, and may help draw other components in the coating system into pores in the substrate. The olefinic compound also appears to help the cured coating adhere to the substrate following cure. The PVC dispersion resin appears to limit wetting or penetration, and may help prevent other components in the coating system from penetrating so deeply into pores in the substrate that they can not be sufficiently radiation cured. The PVC dispersion resin also appears to help subsequently applied coatings (e.g., a topcoat) adhere to the coated substrate.

Preferred coating systems may also include one or more of the following additional features:

- increasing the resistance of the article to water uptake (into the article);
- increasing the surface integrity of the article (e.g., by acting to reinforce the fiber and cement matrix much like binder in other composite materials);
- protecting against expansion of the article under freeze/thaw conditions; or
- increasing the integrity of the edges of the article by binding the fiber layers together.

A variety of cement fiberboard substrates may be coated using the disclosed method. The disclosed substrates typically include cement and a filler. Exemplary fillers include wood, fiberglass, polymers or mixtures thereof. The substrates can be made using methods such as extrusion, the Hatschek method, or other methods known in the art. See, e.g., U.S. Patent Application No. 2005/0208285 A1 (corresponds to International Patent Application No. WO 2005/071179 A1); Australian Patent Application No. 2005100347; International Patent Application No. WO 01/68547 A1; International Patent Application No. WO 98/45222 A1; U.S. Patent Application No. 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or rough-sawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.;

BRESTONE™, CINDERSTONE™, LEDGESTONE, NEWPORT BRICK™, SERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

A variety of olefinic compounds may be used in the disclosed coating systems. The olefinic compounds are distinct from the PVC dispersion resins, and are carbon containing compounds having at least one site of unsaturation which can react, optionally in the presence of an initiator, to provide polymeric or crosslinked products. Non-limiting examples of olefinic compounds include monomers such as (meth)acrylates, vinyls, vinyl ethers, allyl ethers, vinyl esters, unsaturated oils (including mono-, di- and tri-glycerides), unsaturated fatty acids, and the like or mixtures thereof. The olefinic compounds also include oligomers or polymers having at least one site of unsaturation which can react, optionally in the presence of an initiator, to provide polymeric or crosslinked products.

Exemplary olefinic monomers include (meth)acrylate esters of unsubstituted or substituted $C_1$-$C_{15}$ alcohols such as tripropylene glycol, isobornyl alcohol, isodecyl alcohol, phenoxyethyl alcohol, trishydroxyethyl isocyanurate, trimethylolpropane ethoxylate (TMPTA), ditrimethylolpropane ethoxylate (diTMPTA), hexanediol, ethoxylated neopentyl glycol, propoxylated neopentyl glycol, ethoxylated phenol, polyethylene glycol, bisphenol A ethoxylate, trimethylolpropane, propoxylated glycerol, pentaerythritol, tetrahydrofurfuryl alcohol, β-carboxyethyl alcohol, or combination thereof. For example, the olefinic monomer may be isobornyl (meth)acrylate, isodecyl(meth)acrylate, phenoxyethyl(meth)acrylate, trimethylolpropane tri(meth)acrylate, alkoxylated cyclohexane dimethanol di(meth)acrylate, trimethylolpropane ethoxylate tri(meth)acrylate, dipropylene glycol di(meth)acrylate, tripropylene glycol di(meth)acrylate, hexanediol di(meth)acrylate, tetrahydrofurfuryl (meth)acrylate, pentaerythritol tri(meth)acrylate, pentaerythritol tetra(meth)acrylate, di-(trimethyolpropane tetra(meth)acrylate), propoxylated glycerol tri(meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth)acrylate, di-(trimethyolpropane tetra(meth)acrylate) or combination thereof. Preferred olefinic monomers include trimethylolpropane tri(meth)acrylate, bisphenol A ethoxylate di(meth)acrylate, propoxylated glycerol tri(meth)acrylate, trimethylolpropane ethoxylate tri(meth)acrylate, di-(trimethyolpropane tetra(meth)acrylate), or combination thereof. The olefinic monomer may contain a ($C_1$-$C_{15}$) alcohol radical such as hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, 6-hydroxyhexyl, 1,6-dihydroxyhexyl, 1,4-dihydroxybutyl, and the like.

Exemplary allyl ether monomers contain one or more allyl ether groups which typically are bonded to a core structural group which can be based on a wide variety of polyhydric alcohols. Non-limiting examples of suitable polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and any of the other polyols mentioned above in connection with the (meth)acrylate esters. Other exemplary allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Preferred allyl ethers include poly propoxylated and ethoxylated forms of allyl ethers.

Exemplary vinyl ether monomers contain one or more vinyl ether groups and include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Preferred vinyl ether monomers include propoxylated or ethoxylated forms of vinyl ether monomers.

The olefinic compounds can include latex polymers or polyurethane dispersions having attached olefinic groups. These compounds can be prepared as described in applicants' copending PCT Application Serial No. (PCT/US2007/061326), filed Jan. 30, 2007 and entitled COATING SYSTEM FOR CEMENT COMPOSITE ARTICLES.

A subset of the previously mentioned olefinic compounds (e.g., hexanediol di(meth)acrylate, trimethylolpropane tri (meth)acrylate and di-trimethyolpropane tetra(meth)acrylate) have multiple (e.g., two or more) reactive groups. These monomers or oligomers can function as crosslinking agents.

The disclosed coating systems or coating compositions preferably contain about 2 to 100% by weight olefinic compounds based on the total weight of the non-volatile components in the coating system, more preferably about 10 to about 80% by weight and most preferably about 30 to about 70% by weight.

A variety of PVC dispersion resins may be optionally used in the disclosed coating systems and method. A PVC dispersion resin typically contains resin particles (or a mixture of particles of various resins or missed resins) in a liquid plasticizer. The PVC dispersion resin may for example include a PVC homopolymer, copolymer or a combination thereof, and various additives. PVC dispersion resins can be made by emulsion polymerization, micro-suspension polymerization or by a process borrowing from both techniques. PVC dispersion resins typically have very fine particles (avg. 0.1 µm to 1.5 µm). Typically, the PVC dispersion resin particles show little or no porosity and have very high surface area. When sufficient plasticizer is added to a dispersion resin (e.g., about 40 phr or higher) a liquid suspension which may be called a plastisol or organosol is obtained. Copolymers of vinyl chloride and other monomers such as acetates and acrylates can be used to produce dispersion resins. PVC dispersion resins are typically produced by suspension polymerization and have an average particle size range of about 25 µm to 75 µm. Exemplary commercially available PVC dispersion resins include GEON™ resins (e.g., GEON 137, 171, and 172) from Polyone Corporation, Avon Lake, Ohio and NORVINYL™ resins (e.g., NORVINYL S6261, S6571, S7060 and S8060) from Hydro Polymers, Oslo, Norway.

The disclosed coating systems or coating compositions preferably contain about 10 to about 80% by weight PVC dispersion resin based on the total weight of the non-volatile components in the coating system, more preferably, about 20 to about 60% by weight and most preferably about 30% to about 40% by weight.

The disclosed coating systems may include one or more optional silicates (e.g., a silicate salt). Exemplary silicates include lithium silicate, potassium silicate, sodium silicate, ammonium silicate and the like. The amount of silicate may for example be from about 2 to about 50% by weight, from about 5 to about 40% by weight or from about 10 to about 35% by weight, based on the total weight of the non-volatile components. Silicates are available through a variety of chemical suppliers, for example potassium silicate is available from The PQ Corporation, Valley Forge, Pa.

Wet adhesion testing and "freeze-thaw" cycles have been shown, under laboratory conditions, to simulate long-term outdoor exposure encountered in northern climates. A Wet Adhesion Test may be carried out as follows to evaluate adhesion of the coating system after a coated cement fiberboard substrate has been saturated with water. According to this test procedure, coated substrates (e.g., fiber cement boards) are soaked in room temperature water for 24 hours. After soaking, the boards are removed from the water and kept at room temperature for 24 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred coating systems or coating compositions typically have less than 25% coating removal, more preferably less than 15% coating removal. In addition, the failure preferably is within the board as indicated by a significant amount of fiber from the board adhering to the removed coating.

Preferred coated articles can withstand at least 30 freeze-thaw cycles, when tested according to ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The disclosed coating systems or coating compositions preferably have improved, viz., lower, volatile organic content (VOC). The coating systems or coating compositions desirably have a VOC of less than about 5%, based on the total weight of the coating system, preferably a VOC of less than about 2%, more preferably a VOC of less than about 0.5%.

The olefinic compounds are curable by radiation, e.g., visible light, ultra violet light, electron beam, microwave, gamma radiation, infrared radiation and the like. An initiator system is not required for electron beam curing but for other radiation sources typically will be chosen based on the particular type of curing energy (e.g., UV, visible light or other energy) and cationic, free-radical, cationic or other curing mechanism) employed. Thus in one preferred embodiment, the coating system is electron beam curable and does not require an initiator. In another preferred embodiment, the coating system is UV curable and free-radically polymerizable, and includes a UV photoinitiator system which generates free radicals in response to UV light and thereby cures the coating.

Non-limiting examples of initiators include peroxide compounds, azo compounds, cationic-generating initiators, cleavage-type initiators, hydrogen abstraction-type initiators, and the like. Exemplary peroxide compounds include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide and di-(2-ethylhexyl)-peroxydicarbonate. Preferably, the curing agent is t-butyl perbenzoate, methyl ethyl ketone peroxide, or cumene hydroperoxide. Methyl ethyl ketone peroxide conveniently is employed as a solution in dimethyl phthalate, e.g., LUPERSOL™ DDM-9 from Ato-Chem.

Exemplary azo compounds include 2,2-azo bis-(2,4-dimethylpentanenitrile), 2,2-azo bis-(2-methylbutanenitrile) and 2,2-azo bis-(2-methylpropanenitrile).

Exemplary cationic-generating photoinitiators include super acid-generating photoinitiators such as triaryliodonium salts, triarylsulfonium salts and the like. A preferred triarylsulfonium salt is triphenyl sulfonium hexafluorophosphate.

Exemplary cleavage-type photoinitiators include α,α-diethoxyacetophenone (DEAP); dimethoxyphenylacetophenone (IRGACURE™ 651); hydroxycyclo-hexylphenylketone (IRGACURE™ 184); 2-hydroxy-2-methyl-1-phenylpropan-1-one (DAROCUR™ 1173); a 25:75 blend of bis-(2,6-dimethoxybenzoyl)-2,4,4-trimethylpentyl phosphine oxide and 2-hydroxy-2-methyl-1-phenylpropan-1-one (IRGACURE™ 1700), a 50:50 blend of hydroxycyclo-hexylphenylketone and benzophenone (IRGACURE™ 500), 50:50 blend of 2,4,6-trimethylbenzoyl-diphenyl-phosphineoxide and 2-hydroxy-2-methyl-1-phenyl-propan-1-one (DAROCUR™ 4265), bis acryl phosphine (IRGACURE™ 819) and phosphine oxide (IRGACURE™ 2100), all available from Ciba Corporation, Ardsley, N.Y. Other cleavage-type initiators include 2,4,6-trimethylbenzoyl-diphenylphosphine oxide (LUCIRIN™ TPO) from BASF Corporation and a 70:30 blend of oligo 2-hydroxy-2-methyl-[4-(1-methylvinyl)phenyl]propan-1-one and 2-hydroxy-2-methyl-1-phenylpropan-1-one (KIP™ 100) available from Sartomer (Exton, Pa.). Preferred cleavage-type photoinitiators are hydroxycyclo-hexylphenylketone, 2-hydroxy-2-methyl-1-phenylpropan-1-one, benzophenone, 2,4,6-trimethylbenzoyl-diphenylphosphine oxide bis acryl phosphine and a 70:30 blend of 2-hydroxy-2-methyl-[4-(1-methylvinyl)phenyl]propan-1-one and 2-hydroxy-2-methyl-1-phenylpropan-1-one.

Non-limiting examples of hydrogen abstraction-type photoinitiators include benzophenone, substituted benzophenones (e.g., ESCACURE™ TZT of Fratelli-Lamberti) and other diaryl ketones such as xanthones, thioxanthones, Michler's ketone, benzil, quinones and substituted derivatives of all of the above. Camphorquinone is an example of a compound that may be used when one desires to cure a coating system with visible light.

For coating compositions or systems having an olefinic compound including a mixture of two or more of a (meth)acrylate, an allyl ether and a vinyl ether functional group, a combination of curing procedures can be used. For example, a coating composition having a (meth)acrylate and a vinyl ether functional group typically may include an α-cleavage-type or hydrogen abstraction type photoinitiator for polymerization of the (meth)acrylate groups and a cationic-generating photoinitiator for polymerization of the vinyl ether groups.

If desired, the coating composition or system may also include a co-initiator or photoinitiator synergist. Non-limiting examples of co-initiators include (1) tertiary aliphatic amines such as methyl diethanol amine and triethanol amine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate and 2-ethylhexyl-4-(dimethylamino)benzoate; (3) (meth)acrylated amines such as EBECRYL™ 7100 and UVECRYL™ P104 and P115, all from UCB RadCure Specialties; and (4) amino-functional acrylate or methacrylate resin or oligomer blends such as EBECRYL™ 3600 or EBECRYL™ 3703, both from UCB RadCure Specialties. Combinations of the above four categories of co-initiators may also be used.

In the case of visible or UV radiation curing systems, the preferred amount of photoinitiator present in the disclosed coating systems can be from about 0.2 to about 15 wt. % of the non-volatile components. More preferably the photoinitiator can be from about 0.5 to about 10 wt. %, and most preferably the photoinitiator can be from about 0.75 to about 5 wt. % of the non-volatile components.

Other methods for curing the coating systems can be used in combination with methods described herein Such other curing methods include heat cure, chemical cure, anaerobic cure, moisture cure, oxidative cure, and the like. Such methods may require inclusion of a corresponding curing initiator or curing agent in the composition. For example, heat cure can be induced by peroxides, metal curing packages can induce an oxidative cure, or multifunctional amines (for example isophorone diamine) can effect a chemical crosslinking cure through Michael addition of amine groups onto acrylate reactive unsaturated groups. If these additional initiators are present in the coating system they typically make up about 0.1-12% by weight of the curable coating system. Means for effecting cures by such methods are known to those of skill in the art or can be determined using standard methods.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

The coating systems may also contain an optional coalescent and many coalescents are known in the art. The optional coalescent is preferably a low VOC coalescent such as is described in U.S. Pat. No. 6,762,230.

Exemplary coating systems that can be used in the coating systems are listed below. This is not intended to be an exhaustive list of examples of coating systems. The examples include the following compositions:

A One or more olefinic compounds (e.g., monomers, oligomers, or polymers), and an initiator; and B One or more olefinic compounds (e.g., monomers, oligomers, or polymers), an initiator, and one or more PVC dispersion resins.

Composition A—An example of a coating system suitable for use in the invention includes a mixture of (i) olefinic monomers and/or oligomers, (e.g., trimethylolpropane triacrylate (TMPTA) (available from Sartomer); and (ii) an initiator, (e.g., DAROCURE 1173 (D-1173) (available from Ciba).

Composition B—An example of a coating system suitable for use in the invention includes a mixture of (i) olefinic monomers and/or oligomers, (e.g., trimethylolpropane triacrylate (TMPTA); (ii) an initiator, (e.g., DAROCURE 1173 (D-1173); and (iii) PVC dispersion (e.g., GEON 137, 171 or 172 from PolyOne Corporation or NORVINYL S6261, S6571, S7060 or S8060 from Hydro Polymers).

The instant method includes applications of suitable coating systems which can be applied as a single layer or as multiple applications of at least one coating composition. The specific application and order of application of the selected coating compositions can be readily determined by a person skilled in the art of preparing and/or applying such compositions. Exemplary descriptions of these coating systems are described below.

Specific application routes for preparing the coated articles include:

Apply a coating system, and subject the coating system to radiation cure (e.g., electron-beam or UV cure); and Apply a coating composition, apply one or more additional coating composition(s), and subject the resulting coating system to UV cure (e.g., electron-beam or UV cure).

Accordingly, the disclosed articles can be prepared by applying the coating system as a single layer or the coating system can be applied as multiple layers. Coating compositions applied using multiple coating layers may allow mixing of the coating layers at an interface.

In any of the above application routes when there is a carrier (e.g., water or solvent) present in one of more of the compositions, the coated article may be subjected to quick drying to remove at least a portion of any carrier which may be present. Preferably however a carrier is not present and drying is not required, since the gap length (which typically will be less than the length of a standard cement fiberboard substrate, e.g., less than about 2.5 to 3 m) constrains the available space and time within which coating application and radiation curing may be accomplished. The coating composition(s) are preferably applied at about 75 to 100% solids by weight and preferably at about 85 to 100% solids.

The coating systems may be applied by any number of application techniques including but not limited to brushing (e.g., using a brush coater), direct roll coating, reverse roll coating, dip coating and spraying. The various techniques each offer a unique set of advantages and disadvantages depending upon the substrate profile, morphology and tolerable application efficiencies. The disclosed coating systems can for example advantageously be applied to a cement fiberboard substrate by roll coating or spraying. Roll coating can help support the substrate as it passes across the gap. Spraying can be carried out using compact equipment and thus may allow additional space and time within the gap for the performance of other steps including leveling, drying, radiation curing or the application of additional coating composition layers. Lower viscosities facilitate uniform film control. The applied film thickness may be controlled by varying the application rate.

A dry film thickness (DFT) of the coating system on the cement fiberboard substrate can be in the range of, but not limited to about 0.2 to about 2 mil (about 0.005 to about 0.05 mm), more preferably about 0.3 to about 1.5 mil (about 0.008 to about 0.04 mm).

It is preferred that the coated articles are coated on at least the bottom surface with the coating system. More preferably, the coated articles are coated on the bottom surface and up to four minor surfaces including any edges. Most preferably, the coated articles are coated on both major surfaces, and up to four minor surfaces including any edges.

Multiple layers of the disclosed coating systems may be applied. Where multiple layers are to be applied with radiation curing between layers, supporting rollers or groups of supporting rollers may be placed within the gap between a radiation curing unit and a downstream further coating applicator. A topcoat may be applied directly to the coating system.

The coating systems and compositions described herein may be used in place of or in addition to coatings that the prior art has categorized as "sealers," "primers" and "topcoats."

However, the systems and compositions may not fit neatly into any category per se and such terms should not be limiting.

It is also noted that the disclosed coating systems and coating compositions can be used with other coating compositions such as those disclosed in the following applications: U.S. application Ser. Nos. 60/764,103, 60/764,044, 60/764,242, all filed Jan. 31, 2006, and 60/802,185, filed May 19, 2006.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within invention.

What is claimed is:

1. A method for coating a cement fiberboard article, which method comprises:
   (i) providing a conveying system having a first conveyor, a second conveyer and a gap between them;
   (ii) conveying a cement fiberboard article across the gap;
   (iii) applying a liquid radiation-curable coating system to at least the bottom surface of the article while the article passes over the gap; and
   (iv) at least partially curing the coating system to a reduced tack state with radiation before the coated surface contacts the second conveyor.

2. The method of claim 1, wherein the coating system comprises one or more polyvinyl chloride dispersion resins.

3. The method of claim 1, wherein the radiation is visible light, ultra violet light, electron beam, microwave, gamma radiation, infrared radiation or a combination thereof.

4. The method of claim 3, wherein the radiation is ultra violet radiation.

5. The method of claim 3, wherein the radiation is electron beam.

6. The method of claim 1, wherein the cement fiberboard article is a siding product.

7. The method of claim 1, wherein the coating system has a volatile organic content of less than about 5% based on the total weight of the coating system.

8. The method of claim 7, wherein the coating system has a volatile organic content of less than about 0.5% based on the total weight of the coating system.

9. The method of claim 1, wherein the coating system comprises a UV photoinitiator system.

10. The method of claim 1, wherein the coating system comprises one or more olefinic compounds.

11. The method of claim 10, wherein the olefinic compounds comprise one or more monomers.

12. The method of claim 11, wherein the olefinic compounds comprise one or more (meth)acrylate, vinyl, vinyl ether, allyl ether, vinyl ester, unsaturated oil, unsaturated fatty acid or mixture thereof.

13. The method of claim 1, wherein the coating system comprises a polyvinyl chloride dispersion resin.

14. The method of claim 1, further comprising applying a latex polymer topcoat over the coating system.

15. The method of claim 1, wherein the coated article can withstand at least 30 freeze-thaw cycles.

16. The method of claim 15, wherein the coated article can withstand at least 75 freeze-thaw cycles.

17. The method of claim 16, wherein the coated article can withstand at least 175 freeze-thaw cycles.

18. The method of claim 1, wherein the gap is less than 2.5 meters.

19. The method of claim 1, comprising applying the coating system with a roll coater that helps support the article while it passes over the gap.

20. The method of claim 1, further comprising providing supporting rollers within the gap between a radiation curing unit and a downstream further coating applicator, and applying multiple coating system layers with radiation curing between layers.

21. The method of claim 1, comprising applying the coating system by spraying.

22. The method of claim 1, further comprising subjecting the coated article to drying within the gap to remove at least a portion of any carrier which may be present in the coating system.

23. The method of claim 1, comprising at least partially curing the coating system without requiring drying.

24. The method of claim 1, comprising curing the coating system to an essentially fully cured state before the coated surface contacts the second conveyor.

25. The method of claim 1, wherein the coating system contains water.

26. The method of claim 1, wherein the coating system does not contain water.

27. The method of claim 1, wherein the coating system contains solvent.

28. The method of claim 1, comprising applying the coating system at about 75 to 100% solids by weight.

29. The method of claim 1, comprising applying the coating system at about 85 to 100% solids by weight.

30. The method of claim 1, wherein the coating system contains 100% solids.

* * * * *

UNITED STATES PATENT AND TRADEMARK OFFICE
CERTIFICATE OF CORRECTION

PATENT NO.      : 8,057,864 B2
APPLICATION NO. : 12/183975
DATED           : November 15, 2011
INVENTOR(S)     : Larry B. Brandenburger et al.

Page 1 of 1

It is certified that error appears in the above-identified patent and that said Letters Patent is hereby corrected as shown below:

On the Title page, Line 33, Page 3, Item (56): Under Other Publications: "Guerts, J. M. et al." should read --Geurts, J. M. et al.--.

Column 1, Lines 7-8: "...continuation is a National Stage filing of International Application..." should read --...continuation of International Application...--.

Column 4, Line 51: "HARDEHOME™" should read --HARDIEHOME™--.

Column 5, Line 2: "SERRA PREMIUM™" should read --SIERRA PREMIUM™--.

Column 6, Lines 55-56: "Poly-one Corporation" should read --Poly-One Corporation--.

Signed and Sealed this
Twenty-fourth Day of July, 2012

David J. Kappos
*Director of the United States Patent and Trademark Office*